June 18, 1940.   P. PALMGREN   2,205,048
AUTOMOBILE TURNING SIGNAL
Filed Dec. 21, 1938   3 Sheets-Sheet 1

WITNESS
H. Woodard

Inventor
Philip Palmgren
By H. B. Wilson & Co. Attorneys

June 18, 1940.　　　P. PALMGREN　　　2,205,048
AUTOMOBILE TURNING SIGNAL
Filed Dec. 21, 1938　　　3 Sheets-Sheet 2

INVENTOR
Philip Palmgren

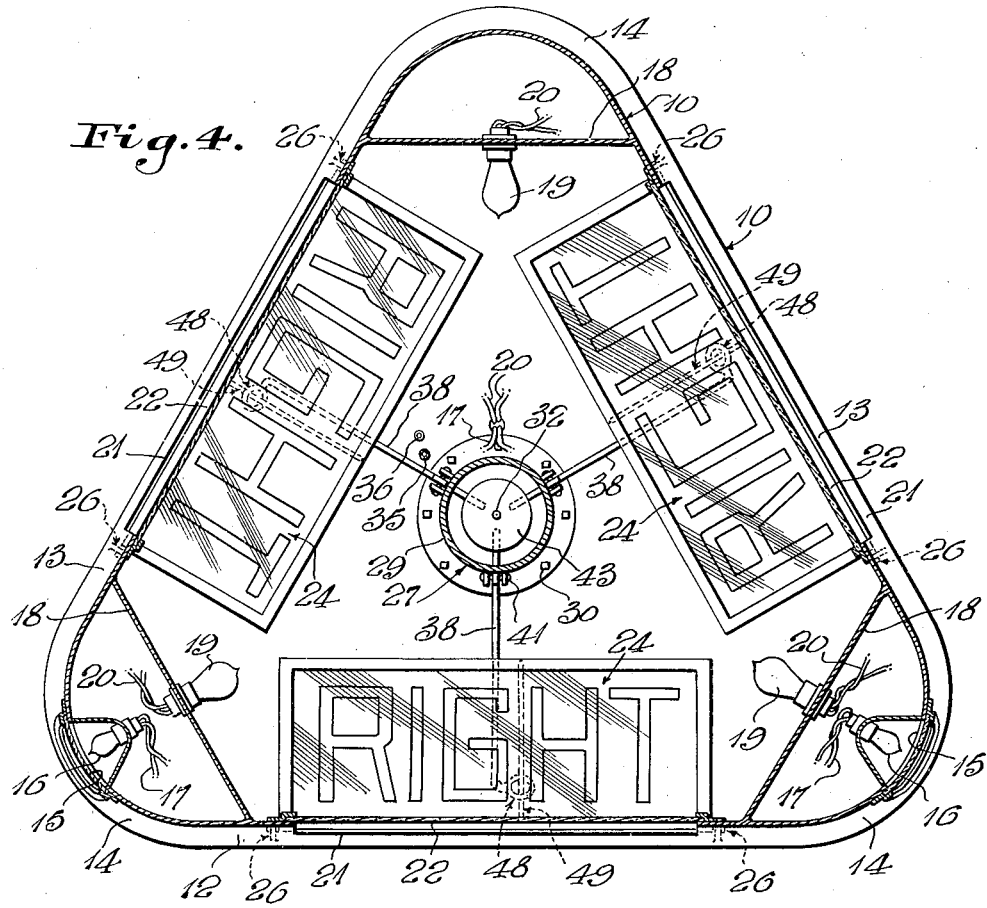
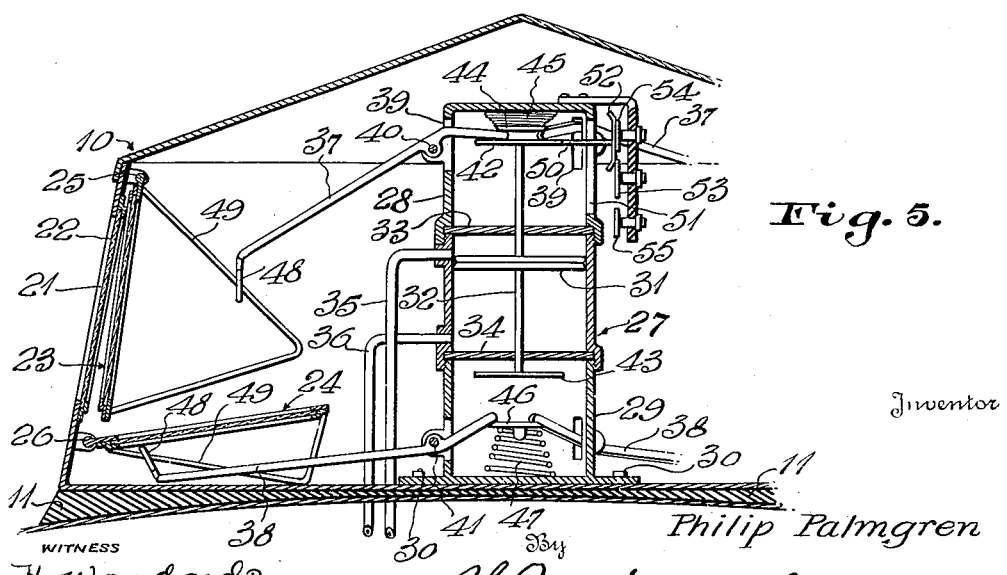

Patented June 18, 1940

2,205,048

UNITED STATES PATENT OFFICE 2,205,048

AUTOMOBILE TURNING SIGNAL

Philip Palmgren, Los Angeles, Calif.

Application December 21, 1938, Serial No. 247,122

3 Claims. (Cl. 116—43)

The invention aims primarily to provide a new and improved signal for use on automobiles (including trucks and busses) for giving conspicuous signals in different directions, preferably forwardly, rearwardly and laterally, when a right or left turn is to be made, thereby materially reducing the hazards to other motorists and to pedestrians now occasioned by such turns.

A further object is to provide a turning signal in which novel provision is made for selectively presenting either right or left turn signs at view openings of a casing and for conspicuously illuminating said signs.

Yet another object is to provide a construction which is rather simple and inexpensive, yet efficient and long-lived.

With the foregoing in view, the invention resides in the novel subject matter hereinafter described and claimed, description being accomplished by reference to the accompanying drawings.

Figure 2:
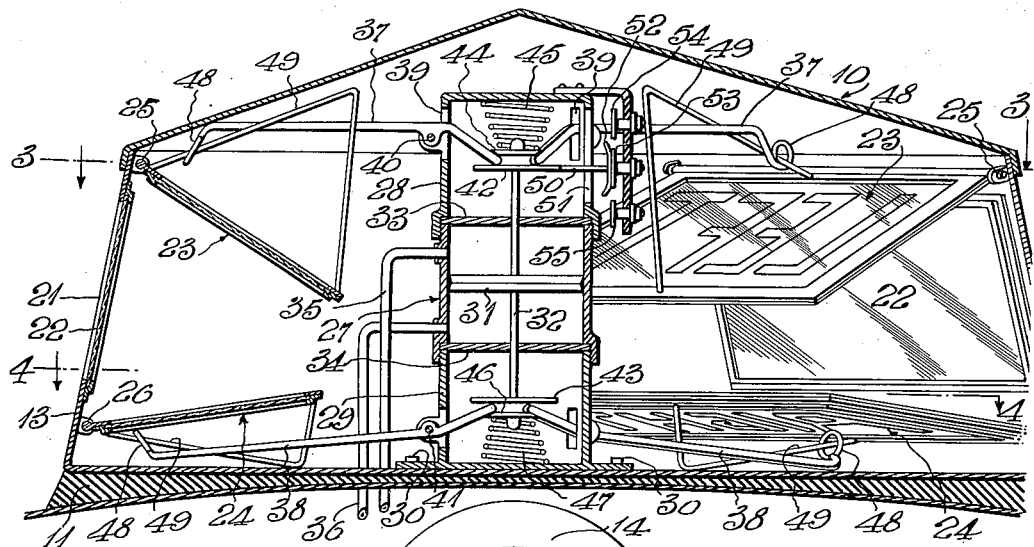
Figure 2 is a vertical section substantially on line 2—2 of Fig. 3.
Figure 3:
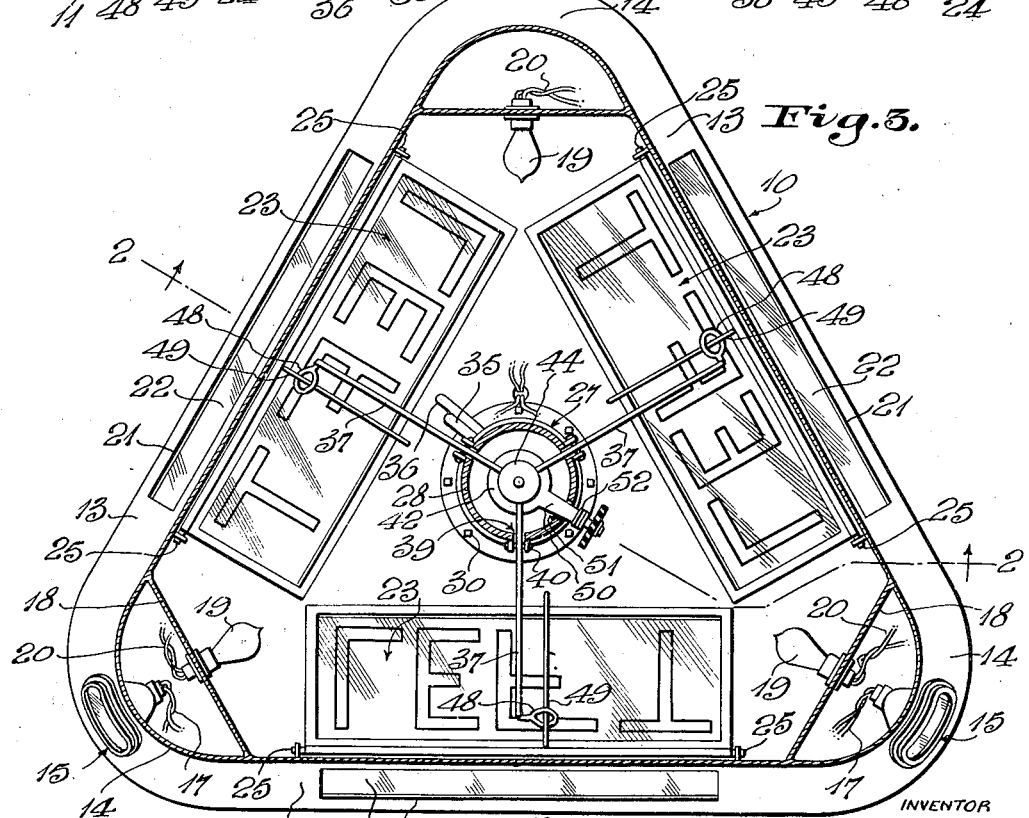

Figures 3 and 4 are horizontal sections on lines 3—3 and 4—4 of Fig. 2.

Figure 5 is a fragmentary view similar to a portion of Fig. 2, but showing one of the signs moved to the view opening with which it coacts.

Figure 1:
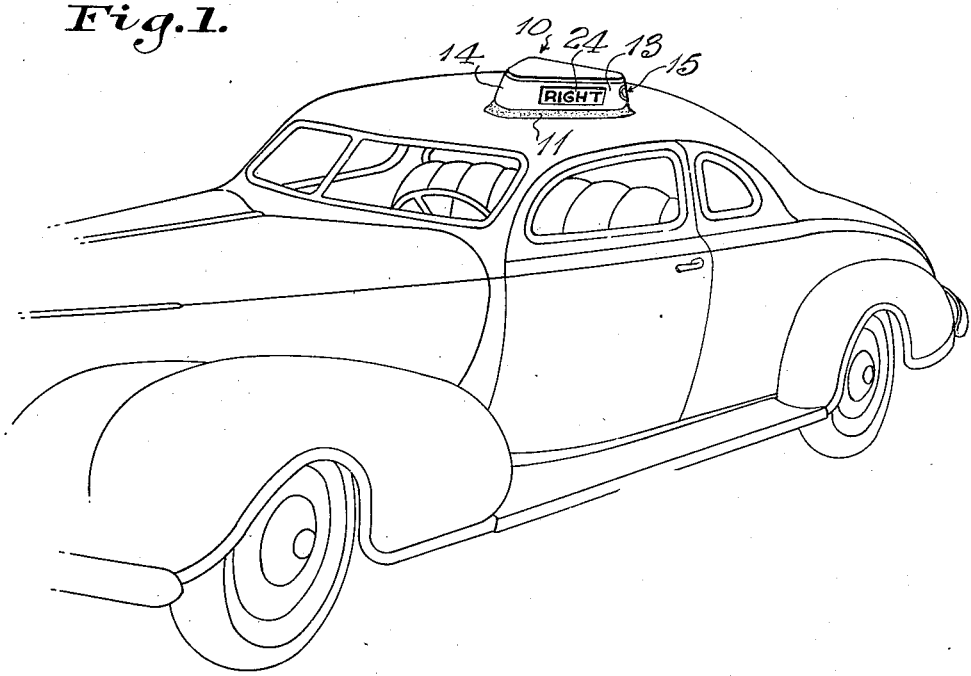
Figure 1 is a perspective view showing the invention applied.
Figure 6:
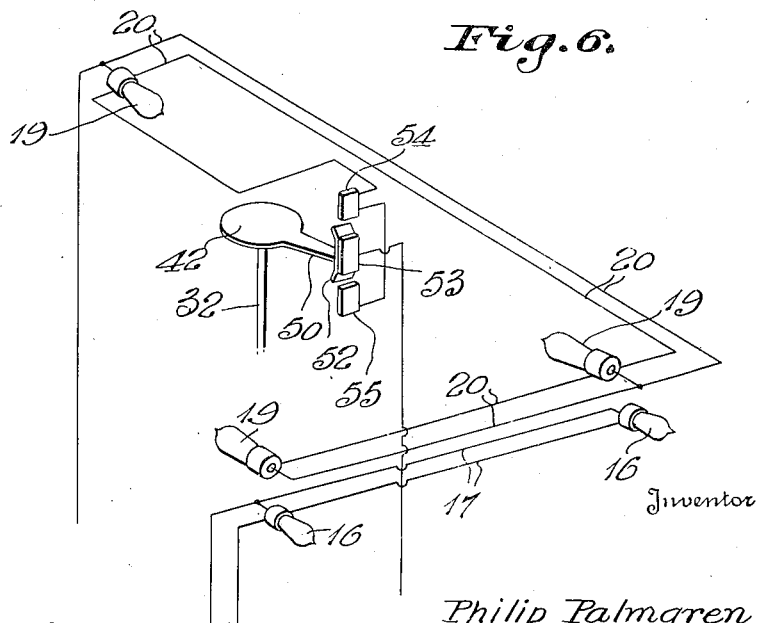

Figure 6 is a wiring and switch diagram.

In the drawings above briefly described, a construction has been illustrated which may be considered as preferred, but within the scope of the invention as claimed, numerous variations may be made.

A casing 10 is provided to be mounted upon the top of an automobile, a suitable gasket 11 of rubber or the like being preferably employed to rest on the top and support the casing. This casing is provided with a vertical rear wall 12, with two forwardly converging walls 13 and with rounded corner portions 14 connecting said walls. The two rearmost of these corner portions 14 may well be provided with view openings 15 covered with red glass or the like for coaction with electric bulbs 16 in giving warning when stops are to be made. Wiring for the bulbs 16 is indicated in a general way at 17, it being understood that said wiring will extend to the usual stop-light switch.

Across the corner portions 14, I have illustrated vertical partitions 18 carrying electric bulbs 19, wiring for which is illustrated at 20, said wiring being suitably connected with the car battery and with an automatic switch hereinafter described.

The three walls 12 and 13 are provided with view openings 21 covered by clear glass or the like 22. Cooperatively related with each opening 21, is a left turn sign 23 and a right turn sign 24. The left turn signs 23 are hingedly mounted at 25 to swing downwardly from normally raised positions, and the right turn signs 24 are hinged at 26 to swing upwardly from normally lowered positions, and novel provision is made for presenting either the left turn signs 23 or the right turn signs 24 at the view openings 21, according to the direction in which the machine is to turn.

A motor is mounted centrally in the casing 10 and in the present disclosure includes a cylinder 27 provided with upper and lower cap-like members 28 and 29 at its ends, the member 29 being suitably secured at 30 to the casing bottom. Within the cylinder 27 is a suitable piston 31 having a rod 32 which projects through both the upper and lower cylinder heads 33 and 34. One suction line 35 is connected with the upper portion of the cylinder 27 and a similar line 36 is connected with the lower portion of said cylinder, said lines being appropriately connected with a suitable control (not shown) for placing either end of the cylinder 27 in communication with the intake manifold or other low pressure portion of the automobile motor. Thus, it will be seen that movement of the piston 31 in either direction may be effected. Provision is made whereby movement of the piston in one direction will present the left turn signs 23 at the view openings 21 and whereby movement of said piston in the opposite direction will present the right turn signs 24 at said view openings.

In the present disclosure, upper and lower sets of levers 37 and 38 are actuated by the movements of the piston 31 to swing the signs 23 and 24. The levers 37 pass through slots 39 in the upper cap-member 28 and are fulcrumed to said cap member at 40. The lower levers 38 are similarly associated with the member 29 and are fulcrumed thereto at 41.

The upper portion of the piston rod 32 is provided with a disk 42 underlying the inner ends of the levers 37, and the lower end of said rod is provided with a similar disk 43 overlying the inner ends of the levers 38. Another disk 44 rests upon the inner ends of the levers 37 and is forced downwardly by a coiled spring 45. The disk 46 also underlies the inner ends of the levers 38 and is forced upwardly by a coiled spring 47. The springs 45 and 47 hold the disks 44 and 46 against the inner ends of the levers and hold said lever ends against the disks 42 and 43 of the piston rod 32, thereby holding the piston 31, the levers 37 and 38 and the signs 23 and 24 in idle positions. However, when suction is created through the line 35, the parts will act to lower the signs 23 and present them at the view openings 21; and when suction is created through line 36, the parts will act to present the signs 24 at said view openings. The suction is controlled by the above mentioned valves in convenient reach of the driver, and it will thus be seen that he may signal his intentions of turning in either direction.

While the outer ends of the levers 37 and 38 may be operatively connected in any preferred way with the signs 23 and 24, I prefer to provide said levers with appropriate eyes 48 which loosely surround suitable guide rods or the like 49 secured to the inner sides of the signs.

In the present disclosure, the disk 42 of the piston rod 32 is provided with an arm 50 passing outwardly through a slot 51 in the cap-member 28, said arm being provided with a movable contact 52, which contact is cooperable with a central fixed contact 53 and upper and lower contacts 54 and 55 to control the circuits of the sign-illuminating bulbs 19. The wiring 20 is so connected with this contact or switch means that the bulb circuit is normally broken but will be completed when contact 52 bridges between 53 and 54 upon piston ascent or bridges between 53 and 55 upon piston descent. Thus, each time the piston is operated, to present one set of signs or the other at the view openings 21, the bulbs 19 will be illuminated to conspicuously display said signs.

From the foregoing, taken in connection with the accompanying drawings, it will be seen that novel and advantageous provision has been made for carrying out the objects of the invention, and while structural characteristics have been illustrated, which may be considered as preferred, attention is again invited to the possibility of making variations within the scope of the invention as claimed.

Obviously, any suitable materials may be used in the manufacture of the device and it may be constructed in any preferred size or sizes. The turn signs 23 and 24 may be colored or clear and of transparent or translucent nature.

I claim:

1. An automobile turning signal comprising a casing having a plurality of view openings visible from different directions, a left and a right turn sign operatively associated with each of said view openings and movably mounted for selective presentation at the same, a motor mounted substantially centrally in said casing and having a member movable in opposite directions, operating connections between said member and said right turn signs for simultaneously presenting all of the latter at said view openings when said member is moved in one direction, and additional operating connections between said member and said left turn signs for simultaneously presenting all of these signs at said view openings when said member is moved in the other direction.

2. An automobile turning signal comprising a casing having a plurality of view openings visible from different directions, a left and a right turn sign operatively associated with each of said view openings and movably mounted for selective presentation at the same, a motor mounted substantially centrally in said casing and having a vertically movable member, upper and lower sets of levers fulcrumed in the casing near said member, means so connecting said sets of levers with said member that movement of said member in one direction will simultaneously operate one set of said levers and movement of said member in the other direction will simultaneously operate the other set of levers, connecting means operatively connecting one set of said levers with said right turn signs, and additional connecting means operatively connecting the other set of levers with said left turn signs, placing the presentation of said signs at said view openings under control of said member.

3. An automobile turning signal comprising a casing having a view opening, a right-turn sign and a left-turn sign mounted in said casing for selective presentation at said view opening, a motor mounted in said casing and having a member movable in opposite directions, a sign-operating member mounted in said casing at one end of said movable member and operatively connected with said right-turn sign, an additional sign-operating member mounted in said casing at the other end of said movable member and operatively connected with said left-turn sign, one-way connecting means so connecting said movable member with one of said sign-operating members as to operate the latter and present said right-turn sign at said view opening when said movable member is moved in one direction, and additional one-way connecting means so connecting said movable member with the other of said sign-operating members as to actuate the latter and present said left-turn sign at said view opening when said movable member is moved in the other direction.

PHILIP PALMGREN.